US011981862B2

(12) United States Patent
Shim et al.

(10) Patent No.: US 11,981,862 B2
(45) Date of Patent: May 14, 2024

(54) BIOCIDE COMPOSITION AND USE THEREOF

(71) Applicants: JUSTEQ, LLC, Deerfield, IL (US); ACCULAB CO., LTD., Seoul (KR)

(72) Inventors: Sang Hea Shim, Deerfield, IL (US); Chung Soo Kim, Seoul (KR)

(73) Assignees: JUSTEQ, LLC, Deerfield, IL (US); ACCULAB CO., LTD., Seoul (KR)

(*) Notice: Subject to any disclaimer, the term of this patent is extended or adjusted under 35 U.S.C. 154(b) by 0 days.

(21) Appl. No.: 18/054,725

(22) Filed: Nov. 11, 2022

(65) Prior Publication Data

US 2023/0071077 A1 Mar. 9, 2023

Related U.S. Application Data

(63) Continuation of application No. 17/372,954, filed on Jul. 12, 2021, now Pat. No. 11,499,089, which is a continuation of application No. 16/068,299, filed as application No. PCT/US2017/012475 on Jan. 6, 2017, now Pat. No. 11,066,595.

(60) Provisional application No. 62/275,272, filed on Jan. 6, 2016.

(51) Int. Cl.
 *C09K 8/60* (2006.01)
 *A01N 25/22* (2006.01)
 *A01N 59/00* (2006.01)
 *C09K 8/54* (2006.01)

(52) U.S. Cl.
 CPC .............. *C09K 8/605* (2013.01); *A01N 25/22* (2013.01); *A01N 59/00* (2013.01); *C09K 8/54* (2013.01); *C09K 2208/32* (2013.01)

(58) Field of Classification Search
None
See application file for complete search history.

(56) References Cited

U.S. PATENT DOCUMENTS

| 4,507,212 | A | * | 3/1985 | Dria | C09K 8/605 |
| | | | | | 507/920 |
| 4,620,595 | A | * | 11/1986 | Schutt | C09K 8/58 |
| | | | | | 166/275 |
| 5,069,286 | A | | 12/1991 | Roensch | |
| 6,669,904 | B1 | | 12/2003 | Vang et al. | |
| 7,578,968 | B1 | | 8/2009 | Nalepa et al. | |
| 11,066,595 | B2 | | 7/2021 | Shim et al. | |
| 11,499,089 | B2 | | 11/2022 | Shim et al. | |
| 2002/0056689 | A1 | | 5/2002 | Shim et al. | |
| 2003/0092581 | A1 | * | 5/2003 | Crews | C09K 8/685 |
| | | | | | 507/100 |
| 2004/0120853 | A1 | * | 6/2004 | Carpenter | A01N 59/00 |
| | | | | | 166/305.1 |
| 2009/0145857 | A1 | | 6/2009 | Martin | |
| 2011/0230394 | A1 | | 9/2011 | Wiatr | |
| 2013/0264059 | A1 | | 10/2013 | Keasler | |
| 2013/0264509 | A1 | | 10/2013 | Shalev | |
| 2013/0306321 | A1 | | 11/2013 | Lanctot-Downs | |
| 2015/0119245 | A1 | | 4/2015 | Robertson, Jr. | |
| 2015/0275627 | A1 | | 10/2015 | Xu | |
| 2016/0271565 | A1 | | 9/2016 | Liu | |

FOREIGN PATENT DOCUMENTS

| KR | 20010066833 A | 7/2001 | | |
| WO | WO-2004059121 A1 | * | 7/2004 | ............. A01N 59/00 |

OTHER PUBLICATIONS

PCT Search Report and Written Opinion prepared for PCT/US2017/012475, completed Feb. 27, 2017.

* cited by examiner

*Primary Examiner* — Charles R Nold
(74) *Attorney, Agent, or Firm* — Barnes & Thornburg LLP

(57) ABSTRACT

The present disclosure relates to biocide compositions, formulations and methods for using formulations. In particular the present disclosure relates to biocide compositions and their use in effecting biocidal activity in subterranean oil and gas wells being drilled, completed, worked over or produced.

20 Claims, No Drawings

BIOCIDE COMPOSITION AND USE THEREOF

CROSS-REFERENCE TO RELATED APPLICATIONS

This application is a continuation of U.S. patent application Ser. No. 17/372,954, issued as U.S. patent Ser. No. 11/449,089 on Nov. 15, 2022, which is a continuation of U.S. patent application Ser. No. 16/068,299, issued as U.S. patent Ser. No. 11/066,595 on Jul. 20, 2021, which is a national stage entry under 35 USC § 371 of PCT International Application Number PCT/US2017/012475, filed Jan. 6, 2017, which claims the benefit under 35 USC § 119(e) of U.S. Provisional Patent Application Ser. No. 62/275,272, filed on Jan. 6, 2016, each of which are expressly incorporated herein by reference.

FIELD

The present disclosure relates to biocide compositions, formulations and methods for using formulations. In particular the present disclosure relates to biocide compositions and their use in effecting biocidal activity in subterranean oil and gas wells being drilled, completed, worked over or produced.

BACKGROUND

The oil and gas drilling process is time consuming and expensive, and is a driver of many of the world's economies. Integral to the health of the industry are the ability to maintain equipment and lower the cost of production. One exemplary area in which these needs are strongly felt is in hydraulic fracturing (also referred to as "slickwater" fracturing, deep matrix hydraulic fracturing, hydrofracturing, hydrofracking, fracking or fraccing) which has become increasingly important since the advent of shale gas plays. The use of water is ubiquitous in hydraulic fracturing, and the maintenance of biological control over the system is critical. Hydraulic fracturing is often a precondition for transforming low permeability shale gas reservoirs into commercial assets; however, hydraulic fracturing also finds application in other well types, such as in tight gas, tight oil and coal seam gas.

Microorganisms can play a damaging role in the hydraulic fracturing process, and can lead to higher costs of production and, in some cases, failure of the well. For example, microorganisms can cause well souring, equipment plugging, loss of formation injectivity, destruction of essential additives and microbiologically induced corrosion (MIC, also known as "microbiologically influenced corrosion"). As a result, biocides find numerous uses in the oil or gas field, such as, in remediation or prevention. For example, biocides can be applied to reduce or "knockdown" the high numbers of bacteria in formulations that are pumped downhole in connection with fracturing, reinjection or other oil or gas field operations.

Because of the drawbacks of existing biocides used in connection with oil and gas well production, there exists a need for more efficient, economical and compatible biocide compositions and methods for controlling microorganisms throughout the oil and gas well machinery and process.

Throughout this disclosure, various publications, patents and patent applications are referenced. The disclosures of these publications, patents and applications in their entireties are hereby incorporated by reference into this disclosure.

SUMMARY

It has been discovered that certain biocide compositions of hypobromous acid (HOBr) formed from contacting a stabilized hypochlorous acid (a.k.a. stabilized chlorine) solution with a water soluble bromide ion source (Be). In some embodiments, the disclosure provides a process for effecting biocidal activity in an oil and gas well being drilled, completed, worked over or produced comprising treating the oil and gas well with a composition of the disclosure. In some embodiments, the disclosure provides a process for effecting biocidal activity in a well fluid for use in an oil and gas well being drilled, completed, worked over or produced comprising blending a composition of the disclosure with the well fluid. In some embodiments, the compositions described herein can be applied to fracturing fluids, drilling muds, completion fluids, waterflood applications, and pipeline conservation.

In some embodiments, the disclosure provides a process for reducing a bacterial population in a gas or oil well comprising,
  a. treating the gas or oil well with a stabilized hypochlorous acid solution, and
  b. treating the gas or oil well with a water soluble bromide ion source.

In some embodiments, the disclosure provides a process for treating flowback water in a gas or oil well comprising,
  a. treating the flowback water with a stabilized hypochlorous acid solution, and
  b. treating the flowback water with a water soluble bromide ion source.

In some embodiments, the disclosure provides a process for preventing well souring in a gas or oil well comprising,
  a. treating the gas or oil well with a stabilized hypochlorous acid solution, and
  b. treating the gas or oil well with a water soluble bromide ion source.

In some embodiments, the disclosure provides a process for controlling biofilms on gas or oil well equipment comprising,
  a. treating the gas or oil well equipment with a stabilized hypochlorous acid solution, and
  b. treating the gas or oil well equipment with a water soluble bromide ion source.

In some embodiments, the disclosure provides a process for preventing microbiologically influenced corrosion on gas or oil well equipment comprising,
  a. treating the gas or oil well equipment with a stabilized hypochlorous acid solution, and
  b. treating the gas or oil well equipment with a water soluble bromide ion source.

In some embodiments, the disclosure provides a process for treating water in a gas or oil well comprising,
  a. treating the gas or oil well with a stabilized hypochlorous acid solution, and
  b. treating the gas or oil well with a water soluble bromide ion source.

In some embodiments, the disclosure provides a process for controlling bacterial growth in a frac fluid comprising,
  a. treating the frac fluid with a stabilized hypochlorous acid solution, and
  b. treating the frac fluid with a water soluble bromide ion source.

In some embodiments, the disclosure provides a method of controlling bacterial growth in a frac fluid comprising, treating the frac fluid with a biocide composition comprising a stabilized hypochlorous acid solution, and a water soluble bromide ion source.

In some embodiments, the disclosure provides a composition for use in the drilling, completion, work over or production of subterranean oil and gas wells comprising hypobromous acid (HOBr) formed from contacting a stabilized hypochlorous acid solution with a water soluble bromide ion source.

DETAILED DESCRIPTION

Microorganisms that play a role in gas and oil well can originate from a variety of sources, possibly including, but not limited to, the subterranean environment of the rock formation itself, and more often by introduction through external sources, such as ground water or source water used in the fracking process, personnel or equipment associated with the drilling process. Microorganisms that can be controlled in connection with the present disclosure include extremophiles (also known as "archaea"), both aerobic and anaerobic bacteria, bacteria commonly found in ground water, bacteria that form biofilms, and the like. Such bacteria include sulfate-reducing bacteria (SRB), responsible for the formation of hydrogen sulfide ($H_2S$), general heterotrophic bacteria (GHB), acid-producing bacteria (APB), nitrate reducing bacteria (NRB), and the like. SRB play numerous detrimental roles in oil and gas wells through the production of $H_2S$, known as souring, including sulfide stress corrosion cracking, hydrogen-induced cracking, enhanced pitting and corrosion rates, generalized corrosion (e.g. MIC), leaks, and the like. Examples of SRB include, but are not limited to those known in the art, within the genera, desulfobacterales, desulfovibrionales, syntrophobacterales, *Desulfotomaculum*, desulfosporomusa, *Desulfosporosinus, Archaeoglobus, Thermocladium* and *Caldivirga*, within the phyla thermodesulfobacteria and *Thermodesulfobium*, the species *Thermodesulfovibrio*, and the like. As with SRB, APB, especially biofilm producing APB, can also play a role in MIC due to the production of acid below the biofilm which can make the microenvironment between the biofilm and its carrier acidic.

One advantage of the biocide compositions described herein is their effectiveness against a wide range of microorganisms, including those described herein. In some embodiments, the biocide compositions described herein are effective to "knockdown" the numbers of bacteria in a well system or well fluid (e.g. a frac fluid). In some embodiments, the compositions described herein are effective to maintain microbiological control in a well system or well fluid. In some embodiments, the disclosure provides a method to knockdown SRB and APB comprising treating a well fluid (or frac fluid) with a composition as described herein. One particular advantage of the biocide compositions of the present disclosure are their ability to penetrate biofilms. As a result, the biocides described herein can be particularly effective in maintaining well equipment by controlling microorganism biofilms. The studies of Example 1-4 described herein demonstrate that the biocide of the disclosure (exemplified by Biocide A) were compatible with the gel-type and slickwater-type fracturing fluids. The properties of gel and slickwater did not change with addition of Biocide A. The studies also indicate that the biocide of the disclosure provides long-lasting chlorine residual. The study in the slickwater-type solution indicates that Biocide A applied at 100 ppm provides a 3-log reduction in aerobic bacteria counts.

While well fluids, such as frac fluids, are often comprised largely of water, the fluids also often contain numerous other additives and components. Such additives and components include, but are not limited to, proppants (e.g. sand, resin-coated sand, high strength ceramic, sintered bauxite, and the like), acids (e.g. hydrochloric acid), breakers (e.g. ammonium persulfate, NaCl, magnesium peroxide, magnesium oxide, calcium chloride, and the like), clay stabilizers (e.g. choline chloride, tetramethyl ammonium chloride, NaCl, and the like), corrosion inhibitors (e.g. isopropanol, methanol, formic acid, acetaldehyde, and the like), crosslinkers (e.g. petroleum distillate, potassium metaborate, triethanolamine zirconate, boric acid, zirconium complex, ethylene glycol, and the like), friction reducers (e.g. polyacrylamide, petroleum distillate, methanol, ethylene glycol, and the like), gelling agents (guar gum, sugar-based polymers, petroleum distillate, ethylene glycol, and the like), iron controlling agents (e.g. citric acid, acetic acid, thioglycolic acid, sodium erythrobate, and the like), scale inhibitors (e.g. acrylamide copolymers, sodium polycarboxylate, phosphonates, organophosphonates, and the like), surfactants (e.g. lauryl sulfate, ethanol, naphthalene, isopropyl alcohol, 2-butoxyethanol, and the like), drilling mud additives (e.g. starch), pH adjusting agents (NaOH, KOH, acetic acid, $Na_2CO_3$, and the like), and the like. Exemplary scale inhibitors, include but are not limited, AMP (aminomethylene phosphonic acid), HEDP (hydroxyethylidene diphosphonic acid), or PBTC (phosphonobutanetricarboxylic acid, and the like.

Among the various additives and components included in well fluids, several can serve as food sources for various types of bacteria, including guar gum, polyacrylamide, polymers, starch and other organic compounds. The presence of these components can cause contamination downhole and in the well fluid reservoir. Food sources for microorganisms can be problematic in flowback water, which can account for 10-40% of water used in the well, and returns to the surface often to be stored in the well fluid reservoir for long periods of time. One advantage of the compositions described herein is their compatibility with many of the additives and components used in well fluids. Due to their enhanced stability and compatibility with well fluid additives and components, the biocide compositions of the present disclosure are advantageous over biocides known in the art, such as stabilized bromine, because the amount of biocide "sacrificed" as a result of incompatibility or instability will be significantly reduced compared to the biocide of the prior art. The results of the Examples provided herein indicate that the biocide of the disclosure is much less aggressive toward many chemical additives for the oil and gas field aqueous fluids than other oxidizing biocides. This biocide is also much less toxic than most of the non-oxidizing biocides currently used in the industry currently Compositions of hypobromous acid, and methods for producing the same, for defouling aqueous systems that are useful in connection with the present teachings include those described in U.S. Pat. Nos. 6,478,972 and 7,341,671, incorporated herein by reference. In some embodiments, such compositions can be characterized by a mixture of stabilized chlorine and a small percentage of sodium bromide useful as a biocide. In some embodiments, hypobromous acid (HOBr) can be formed by the reaction between hypochlorous acid (HOCl) and a water soluble bromide ion source ($Br^+$). In some embodiments, a stabilized hypochlorous acid solution is formed by contacting a chlorine source with a stabilizing agent in an aqueous solution.

Suitable chlorine sources for use in connection with the present disclosure include but are not limited to alkali or alkaline earth metal hypochlorite or chlorine gas. Suitable alkali or alkaline earth metal hypochlorites useful in the present invention include sodium hypochlorite, potassium hypochlorite, lithium hypochlorite, magnesium hypochlorite, calcium hypochlorite, a chlorinating agent, such as trichloroisocyanuric acid, sodium dichlorocyanuric acid, or dichlorohydantoin, and mixtures thereof. In some embodiments, the chlorine source can be sodium hypochlorite or calcium hypochlorite.

The alkali or alkaline earth metal hypochlorous acid preferably contains about 5 to about 70% of chlorine as active halogen.

Suitable bromide ion source useful in the present invention include, but are not limited to, sodium bromide, potassium bromide, lithium bromide, chlorine bromide, and bromine. In some embodiments, the bromide ion source can be sodium bromide.

Suitable stabilizers useful in the present invention include, but are not limited to, acid amide derivatives of carbonic acid, carboxylic acid, amino acid, sulfuric acid, or phosphoric acid, and the acid amide derivatives are exemplified by urea, thiourea, creatinine, mono or di-ethanolamine, organic sulfonamide, biuret, sulfamic acid, organic sulfamate, melamine, and the like. In some embodiments, the stabilizer can be sulfamic acid.

In some embodiments, the stabilized hypochlorous acid can be prepared in an alkali solution having a pH of at least 11. In some embodiments, a stabilized aqueous alkali or alkaline earth metal hypochlorous acid solution is prepared by primarily dissolving a stabilizer in an alkali solution having a pH of at least 11, and then adding a chlorine source including, for example, alkali or alkaline earth metal hypochlorite into the solution. The alkali solution can be formed by dissolving an inorganic base, such as sodium hydroxide, in water. It will be appreciated that the base (or caustic) used to prepare the alkali solution can be any inorganic base known in the art. In some embodiments, the stabilized hypochlorous acid can be prepared in an alkali solution having a pH in the range of 8 to 9.

In accordance with the present disclosure, a stabilized aqueous hypochlorous acid solution can be prepared by reacting a chlorine source with a stabilizer in a molar ratio of 1:9 to 9:1. The stabilized aqueous hypochlorous acid solution can be supplemented with a bromide ion source in a molar ratio of 1:10 to 50:1, and more preferably, 1:1 to 20:1.

A biocide prepared according to the method of the present disclosure is, preferably, added to water systems in the level of 0.1 to 10 ppm total halogen residual, and more preferably, 0.2 to 5 ppm.

The content of each ingredient depends on the degree of contamination. In some embodiments, the disclosure provides a biocide composition having from about 1% to about 20% by weight of a chlorine source. In some embodiments, the chlorine source is about 5% to about 10% by weight. In some embodiments, the chlorine source is about 3%, or about 4%, or about 5%, or about 6%, or about 7%, or about 8%, or about 9%, or about 10%, or about 11%, or about 12%, or about 13% by weight.

In some embodiments, the disclosure provides a biocide composition having from about 1% to about 20% by weight of a stabilizer. In some embodiments, the stabilizer is about 5% to about 10% by weight. In some embodiments, the stabilizer is about 3%, or about 4%, or about 5%, or about 6%, or about 7%, or about 8%, or about 9%, or about 10%, or about 11%, or about 12% by weight.

In some embodiments, the disclosure provides a biocide composition having from about 0.1% to about 15% by weight of a bromide ion source. In some embodiments, the bromide ion source is about 0.1% to about 5% by weight. In some embodiments, the bromide ion source is about 0.3% to about 5% by weight. In some embodiments, the bromide ion source is about 0.5% to about 5% by weight. In some embodiments, the bromide ion source is about 0.3% to about 2% by weight. In some embodiments, the bromide ion source is about 0.5% to about 2% by weight. In some embodiments, the bromide ion source is about 0.3% to about 1% by weight. In some embodiments, the bromide ion source is about 0.5% to about 1% by weight.

In some embodiments, the disclosure provides a biocide composition having from about 1% to about 15% by weight of a base. In some embodiments, the base is about 5% to about 10% by weight. In some embodiments, the base is about 3%, or about 4%, or about 5%, or about 6%, or about 7%, or about 8%, or about 9%, or about 10%, or about 11%, or about 12% by weight.

In any of the embodiments described herein, the remainder of a biocide composition prepared by the methods described can be water.

According to the methods described herein, a mixture of stabilized chlorine and a small percentage of sodium bromide are formed in a solution that can be used as a liquid biocide in well fluids and well systems. According to the embodiments described herein, the methods described produce small amounts of bromine in situ. The amount of bromine formed is sufficient to maintain microbiological control of the system or to serve as a biocidally-effective amount or to produce biological activity (e.g. the discernable destruction of microbiological life). As used herein, the term "biocidally-effective amount" denotes that the amount used controls, kills, or otherwise reduces the bacterial or microbial content of the aqueous fluid in question by a statistically significant amount as compared to the same aqueous fluid prior to treatment with a biocide of this present disclosure.

It will be appreciated that compositions of the present disclosure can be applied to well systems and well fluids by any means known to one of skill in the art, and with no particular limitation on the method. The blending operation can be conducted in any manner conventionally used in blending well fluids generally. Since the biocides, including the preferred biocides, whether formed on site or received from a manufacturer, are mobile aqueous solutions, the blending is rapid and facile. Simple metering or measuring devices and means for mixing or stirring the biocide with the aqueous well fluid can thus be used, if desired. Periodically individual batches of well fluids can be treated with the biocide and used so that the biocide is provided intermittently to the well being drilled or operated. Preferably, however, all of the well fluid used in a given operation is treated with a biocide of this invention so that the biocide is continuously being provided to the well being drilled or operated.

For example, in some embodiments, the compositions described herein can be applied in closed systems, via pump lines from trucks to the well system. In some embodiments, the compositions described herein can be applied in closed systems to, for example a backflow water reservoir. In some embodiments, the compositions described herein can be applied to a well system between a blender vat and a booster pump on a blender (i.e. on the fly).

Typically the amount of the biocide used should provide in the range of about 1 to about 10 ppm, and preferably in the range of about 2 to about 6 ppm of total chlorine in the blended well fluid prior to well application. Departures from these ranges whenever deemed necessary or desirable are permissible and are within the scope of this disclosure.

Yet another advantage of the biocide compositions of the present disclosure is the stability these biocides at elevated temperatures. Thus unlike other biocides known in the art which have relatively poor thermal stability at elevated temperatures, the present biocide compositions can be used in very deep wells where highly elevated temperatures are encountered without premature decomposition. This in turn provides the means for effectively combating heat resistant bacteria that reside at such deep locations.

Having generally described this invention, a further understanding can be obtained by reference to certain specific examples which are provided herein for purposes of illustration only and are not intended to be limiting unless otherwise specified.

EXAMPLES

General Methods

Standard analytical test procedures are available enabling close approximation of "total bromine" and "free bromine" present in aqueous solution. For historical and customer familiarity reasons, these procedures actually express the results of the determinations as "free chlorine" and "total chlorine", which results can then be arithmetically converted to "total bromine" and "free bromine". The procedures are based on classical test procedures devised by Palin in 1974. See A. T. Palin, "Analytical Control of Water Disinfection With Special Reference to Differential DPD Methods For Chlorine, Chlorine Dioxide, Bromine, Iodine and Ozone", *J. Inst. Water Eng.*, 1974, 28, 139. While there are various modernized versions of the Palin procedures, the version of the tests for "free chlorine" and "total chlorine" recommended herein for use, are fully described in *Hach Water Analysis Handbook*, 3rd edition, copyright 1997. The procedure for "free chlorine" is identified in that publication as Method 8021 appearing on page 335, whereas the procedure for "total chlorine" is Method 8167 appearing at page 379. Briefly, the "free chlorine" test involves introducing to the halogenated water a powder comprising DPD indicator powder and a buffer. "Free chlorine" present in the water reacts with the DPD indicator to produce a red to pink coloration. The intensity of the coloration depends upon the concentration of "free chlorine" species present in the sample. This intensity is measured by a calorimeter calibrated to transform the intensity reading into a "free chlorine" value in terms of mg/L $Cl_2$. Similarly, the "total chlorine" test also involves use of DPD indicator and buffer. In this case, KT is present with the DPD and buffer whereby the halogen species present, including nitrogen-combined halogen, reacts with KI to yield iodine species which turn the DPD indicator to red/pink. The intensity of this coloration depends upon the sum of the "free chlorine" species and all other halogen species present in the sample. Consequently, this coloration is transformed by the colorimeter into a "total chlorine" value expressed as mg/L $Cl_2$.

In greater detail, these procedures are as follows:

1. To determine the amount of species present in the aqueous well fluid water which respond to the "free chlorine" and "total chlorine" tests, the sample should be analyzed within a few minutes of being taken, and preferably immediately upon being taken.

2. Hach Method 8021 for testing the amount of species present in the sample which respond to the "free chlorine" test involves use of the Hach Model DR 2010 colorimeter or equivalent. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the aqueous sample under investigation. One of the cells is arbitrarily chosen to be the blank. Using the 10 mL cell riser, this is admitted to the sample compartment of the Hach Model DR 2010, and the shield is closed to prevent stray light effects. Then the ZERO key is depressed. After a few seconds, the display registers 0.00 mg/L $Cl_2$. To a second cell, the contents of a DPD Free Chlorine Powder Pillow are added. This is shaken for 10-20 seconds to mix, as the development of a pink-red color indicates the presence of species in the sample which respond positively to the DPD test reagent. Within one minute of adding the DPD "free chlorine" reagent to the 10 mL of aqueous sample in the sample cell, the blank cell used to zero the instrument is removed from the cell compartment of the Hach Model DR 2010 and replaced with the test sample to which the DPD "free chlorine" test reagent was added. The light shield is then closed as was done for the blank, and the READ key is depressed. The result, in mg/L $Cl_2$ is shown on the display within a few seconds. This is the "free chlorine" level of the water sample under investigation.

3. Hach Method 8167 for testing the amount of species present in the aqueous sample which respond to the "total chlorine" test involves use of the Hach Model DR 2010 colorimeter or equivalent. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the water under investigation. One of the cells is arbitrarily chosen to be the blank. To the second cell, the contents of a DPD Total Chlorine Powder Pillow are added. This is shaken for 10-20 seconds to mix, as the development of a pink-red color indicates the presence of species in the water which respond positively to the DPD "total chlorine" test reagent. On the keypad, the SHIFT TIMER keys are depressed to commence a three-minute reaction time. After three minutes the instrument beeps to signal the reaction is complete. Using the 10 mL cell riser, the blank sample cell is admitted to the sample compartment of the Hach Model DR 2010, and the shield is closed to prevent stray light effects. Then the "ZERO" key is depressed. After a few seconds, the display registers 0.00 mg/L $Cl_2$. Then, the blank sample cell used to zero the instrument is removed from the cell compartment of the Hach Model DR 2010 and replaced with the test sample to which the DPD "total chlorine" test reagent was added. The light shield is then closed as was done for the blank, and the READ key is depressed. The result, in mg/L $Cl_2$ is shown on the display within a few seconds. This is the "total chlorine" level of the water sample under investigation.

4. To convert the readings to bromine readings, the "free chlorine" and the "total chlorine" values should be multiplied by 2.25 to provide the "free bromine" and the "total bromine" values.

Example 1: Exemplary Method for Making a Biocide of the Disclosure

A mixture of stabilized chlorine with sodium bromide can be prepared according to the methods described in U.S. Pat. No. 7,341,671, incorporated herein by reference, and used in the subsequent examples.

Example 1a: Preparation of Biocide A 437.5 g of 16.0% sodium hypochlorite solution was charged in a 1 liter beaker. 98 g of 100% sulfamic acid was dissolved in 319.5 g distilled water and the solution was neutralized by 130 g of 48.5% sodium hydroxide with water cooling of the container. This neutralized sulfamic acid was added into the prepared sodium hypochlorite solution. 15 g of sodium bromide was dissolved in the solution completely. The prepared biocide contained 6.7% chlorine and 1.5% sodium bromide.

Example 2: Determination of Bromine Residual Persistency in a Gel-Type Fracturing Fluid Using Biocide A A sample of synthetic water prepared by adding $CaCl_2$, $NaHCo_3$ and NaCl to distilled water to contain about 110 ppm M alkalinity (as $CaCO_3$), 90 ppm calcium hardness (as $CaCO_3$), and 150 ppm chloride. The pH of the synthetic water was 8.2. Table 1 shows the results of the tests with 100 ppm Biocide A with duration of time in the synthetic water. The results show that the total chlorine decreases very slowly over time in the synthetic water because it has no halogen demand.

TABLE 1

| Time | Theoretical, ppm | Actual, ppm |
|---|---|---|
| Initial | 6.7 | 6.7 |
| 15 mins. | 6.7 | 6.7 |
| 30 mins. | 6.7 | 6.6 |
| 1 hr. | 6.7 | 6.6 |
| 24 hrs | 6.7 | 6.4 |

Example 3

A series of tests were conducted using gel-type fracturing fluid consisted of GasFlo G (surfactant, Baker Hughes), QW-3LDF (gelling agent, oil suspension guar gum, Baker Hughes) and XLW-56 (cross linker, Baker Hughes) to determine chlorine residual persistency.

The procedure for preparing a gel fracturing fluid was as follow:
1. Added proper amount of Biocide A described in Example 1 to synthetic water to make 500 g total water with desired total chlorine residual.
2. Added 0.5 g of GasFlo G surfactant.
3. Added 4 g of QW-3LDF gelling agent.
4. Mixed the solution with a kitchen blender for 5 minutes.
5. Added 0.5 g of XLW-56 cross linker and mix the solution for 2 minutes.

Table 2 shows the results of the tests with 300 and 150 ppm of Biocide A in the gel-type fracturing fluids. These results show that Biocide A provides sufficiently long-lasting chlorine residuals. The properties of the gel-type fracturing solution were not affected by the additions of Biocide A.

TABLE 2

| Time | 300 ppm Biocide A Theoretical, ppm | Actual, ppm | 150 ppm Biocide A Theoretical, ppm | Actual, ppm |
|---|---|---|---|---|
| Initial | 20.1 | 11.5 | 10.1 | 6.7 |
| 15 mins. | 20.1 | 9.7 | 10.1 | 5.1 |
| 30 mins. | 20.1 | 8.2 | 10.1 | 4.2 |
| 1 hr. | 20.1 | 7.3 | 10.1 | 3.1 |
| 24 hrs | 20.1 | 4.5 | 10.1 | 1.8 |

Example 4

A series of tests were conducted to find chlorine residual persistency in slickwater fracturing fluids. At a fracturing site in Pennsylvania, a sample of a pit water to be used for the fracturing job was sampled. Aerobic bacteria count in the sample water was measured using PetriFilm aerobic count plates. 100 ppm of Biocide A was added in the sample water. Total chlorine concentrations and aerobic bacteria counts were performed. The theoretical total chlorine concentration with 100 ppm of Biocide A was 6.7 ppm. The test results show that the sample water consumed some amount of total chlorine and the total chlorine concentration was 4.2 ppm and the value was 3.8 ppm and 3.1 ppm after 30 minutes and 24 hours respectively.

The water was treated with Kemira KemFlo A-4251 (anionic emulsion PAM polyacrylamide acrylic acid). 5 grams of KemFlo A-4251 was added in 500 g sample water and it was mixed with a kitchen blender for 1 minute. 100 ppm of Biocide A was added in the solution and total chlorine concentrations were measured immediately, after 30 minutes and after 24 hours. Aerobic bacteria counts were measured before the biocide addition, just after the addition, after 30 minutes and 24 hours.

The test results are summarized in Table 3. It shows that the type of additive that has been used for these experiments to make slickwater does not seem to consume total chlorine of Biocide A.

TABLE 3

| Sample | Contact Time | Theoretical, ppm | Actual, ppm | Aerobic bacteria count (CFU/mL) |
|---|---|---|---|---|
| Pit Water | Before Biocide | | | $1.3 \times 10^5$ |
| Pit Water | Initial | 6.7 | 4.2 | $4.5 \times 10^3$ |
| Pit Water | 30 min | 6.7 | 3.8 | $2.2 \times 10^2$ |
| Pit Water | 24 hrs | 6.7 | 3.1 | $3.5 \times 10^1$ |
| Pit Water + Additive | Before Biocide | | | $1.2 \times 10^5$ |
| Pit Water + Additive | Initial | 6.7 | 4.1 | $3.2 \times 10^3$ |
| Pit Water + Additive | 30 min | 6.7 | 3.6 | $2.5 \times 10^2$ |
| Pit Water + Additive | 24 hrs | 6.7 | 2.8 | $4.1 \times 10^1$ |

Example 5: Study of Compatibilities of Biocide A with Phosphonate Additives

The phosphonates used were AMP (aminomethylene phosphonic acid), HEDP (hydroxyethylidene diphosphonic acid), or PBTC (phosphonobutanetricarboxylic acid). These materials can be obtained commercially.

Solutions consisting of scale inhibitor (as active phosphonate) in the presence of biocide can be prepared as follows.

To deionized water can be added appropriate stock solutions containing phosphonate, alkalinity (e.g. NaHCO$_3$), and calcium hardness (e.g. CaCl$_2$). The pH can be adjusted to about 9 with a base (e.g. 5% aq. NaOH) and diluted up to 1 L in a dark amber bottle. A dose of biocide can be added to achieve a residual. The solutions can then be periodically monitored for phosphonate reversion by determining the reversion to orthophosphate (Hach method 490). The oxidant residual can also be periodically monitored using the DPD method (Hach method 80). This example can be performed at room temperature (23° C.). The initial active phosphonate content can be confirmed by conversion to orthophosphate via UV/persulfate oxidation followed by a conventional phosphate analysis (Hach method 501). A conversion factor can be applied to the phosphate measurement to determine the initial amount of active phosphonate present.

Solutions consisting of 5 ppm scale inhibitors in the synthetic water described in Example 2 were tested with total chlorine concentration of 10 ppm by Biocide A or chlorine bleach. The solutions were periodically monitored for phosphonate reversion by determining the reversion to orthophosphate. The oxidant residual was also periodically monitored using DPD method. The theoretical conversion factors for AMP, HEDP and PBTC are 1.05, 1.085 and 2.85 respectively.

Table 4 show the results with AMP. AMP was not converted to orthophosphate even after 24 hours by Biocide A, whereas, 23% of AMP was converted to orthophosphate by chlorine after 24 hours.

TABLE 4

| Time, hrs | Biocide A Ortho-phosphate, ppm | Reversion rate, % | Chlorine Ortho-phosphate, ppm | Reversion rate, % |
| --- | --- | --- | --- | --- |
| 0 | 0 | 0% | 0 | 0% |
| 1 | 0 | 0% | 0.5 | 10% |
| 5 | 0 | 0% | 0.8 | 17% |
| 10 | 0 | 0% | 0.9 | 19% |
| 24 | 0 | 0% | 1.1 | 23% |

Table 5 show the results with HEDP. HEDP was not converted to orthophosphate even after 24 hours by Biocide A, whereas, 20% of HEDP was converted to orthophosphate by chlorine after 24 hours.

TABLE 5

| Time, hrs | Biocide A Ortho-phosphate, ppm | Reversion rate, % | Chlorine Ortho-phosphate, ppm | Reversion rate, % |
| --- | --- | --- | --- | --- |
| 0 | 0 | 0% | 0 | 0% |
| 1 | 0 | 0% | 0.4 | 8% |
| 5 | 0 | 0% | 0.6 | 13% |
| 10 | 0 | 0% | 0.7 | 15% |
| 24 | 0 | 0% | 0.9 | 20% |

Table 6 show the results with PBTC. PBTC was very stable chemical and is not converted easily to orthophosphate. It was not converted to orthophosphate even after 24 hours by Biocide A and 4% of PBTC was converted to orthophosphate by chlorine after 24 hours.

TABLE 6

| Time, hrs | Biocide A Ortho-phosphate, ppm | Reversion rate, % | Chlorine Ortho-phosphate, ppm | Reversion rate, % |
| --- | --- | --- | --- | --- |
| 0 | 0 | 0% | 0 | 0% |
| 1 | 0 | 0% | 0 | 0% |
| 5 | 0 | 0% | 0.05 | 3% |
| 10 | 0 | 0% | 0.07 | 4% |
| 24 | 0 | 0% | 0.08 | 4% |

What is claimed is:

1. A process for preventing well souring in a gas or oil well comprising,
   treating the gas or oil well with an aqueous, oxidizing biocide comprising
   a stabilized hypochlorous acid solution having a pH of at least 11, and
   a water soluble bromide ion source,
   wherein the aqueous, oxidizing biocide contains about 1% by weight to about 20% by weight of a chlorine source, about 1% by weight to about 20% by weight of a stabilizer, about 5% by weight to about 10% by weight of a base, about 0.1% by weight to about 15% by weight of a water soluble bromide ion source, and about 35% by weight to about 92.9% by weight of water,
   wherein the oil or gas well contains one or more compositions, wherein the one or more compositions comprise one or more crosslinkers, gelling agents, friction reducers, or surfactants.

2. The process of claim 1, wherein the one or more crosslinkers is petroleum distillate, potassium metaborate, triethanolamine zirconate, boric acid, zirconium complex, or ethylene glycol.

3. The process of claim 1, wherein the one or more gelling agents is guar gum, sugar-based polymers, petroleum distillate, or ethylene glycol.

4. The process of claim 1, wherein the one or more surfactants is lauryl sulfate, ethanol, naphthalene, isopropyl alcohol, or 2-butoxyethanol.

5. The process of claim 1, wherein the one or more friction reducers is a polyacrylamide, a petroleum distillate, methanol, or ethylene glycol.

6. The process of claim 5, wherein the one or more friction reducers does not consume total chlorine of the biocide, and the friction reducer is compatible with the biocide.

7. The process of claim 1, wherein the biocide provides a chlorine residual for up to about 24 hours after treating.

8. A process for preventing microbiologically influenced corrosion on gas or oil well equipment comprising,
   treating the gas or oil well equipment with an aqueous, oxidizing biocide comprising
   a stabilized hypochlorous acid solution having a pH of at least 11, and
   a water soluble bromide ion source,
   wherein the aqueous, oxidizing biocide contains about 1% by weight to about 20% by weight of a chlorine source, about 1% by weight to about 20% by weight of a stabilizer, about 5% by weight to about 10% by weight of a base, about 0.1% by weight to about 15% by weight of a water soluble bromide ion source, and about 35% by weight to about 92.9% by weight of water, wherein the oil or gas well equipment contains one or more crosslinkers, gelling agents, friction reducers, or surfactants.

9. The process of claim 8, wherein the one or more crosslinkers is petroleum distillate, potassium metaborate, triethanolamine zirconate, boric acid, zirconium complex, or ethylene glycol.

10. The process of claim 8, wherein the one or more gelling agents is guar gum, sugar-based polymers, petroleum distillate, or ethylene glycol.

11. The process of claim 8, wherein the one or more surfactants is lauryl sulfate, ethanol, naphthalene, isopropyl alcohol, or 2-butoxyethanol.

12. The process of claim 8, wherein the one or more friction reducers is a polyacrylamide, a petroleum distillate, methanol, or ethylene glycol.

13. The process of claim 12, wherein the one or more friction reducers does not consume total chlorine of the biocide, and the friction reducer is compatible with the biocide.

14. The process of claim 8, wherein the biocide provides a chlorine residual for up to about 24 hours after treating.

15. A process for controlling bacterial growth in a frac fluid comprising,
  treating the frac fluid with an aqueous, oxidizing biocide comprising
  a stabilized hypochlorous acid solution having a pH of at least 11, and
  a water soluble bromide ion source, wherein the aqueous, oxidizing biocide contains about 1% by weight to about 20% by weight of a chlorine source, about 1% by weight to about 20% by weight of a stabilizer, about 5% by weight to about 10% by weight of a base, about 0.1% by weight to about 15% by weight of a water soluble bromide ion source, and about 35% by weight to about 92.9% by weight of water;
  wherein the frac fluid contains one or more crosslinkers, gelling agents, friction reducers, or surfactants.

16. The process of claim 15, wherein the one or more crosslinkers is petroleum distillate, potassium metaborate, triethanolamine zirconate, boric acid, zirconium complex, or ethylene glycol.

17. The process of claim 15, wherein the one or more gelling agents is guar gum, sugar-based polymers, petroleum distillate, or ethylene glycol.

18. The process of claim 15, wherein the one or more surfactants is lauryl sulfate, ethanol, naphthalene, isopropyl alcohol, or 2-butoxyethanol.

19. The process of claim 15, wherein the one or more friction reducers is a polyacrylamide, a petroleum distillate, methanol, or ethylene glycol.

20. The process of claim 15, wherein the frac fluid is a gelled frac fluid that is stable when treated the biocide, and the biocide provides a chlorine residual for up to about 24 hours after treating.

* * * * *